Nov. 20, 1962 R. W. BROWN 3,064,501
CUTTING TOOL FEED MECHANISM
Filed March 29, 1961 3 Sheets-Sheet 3
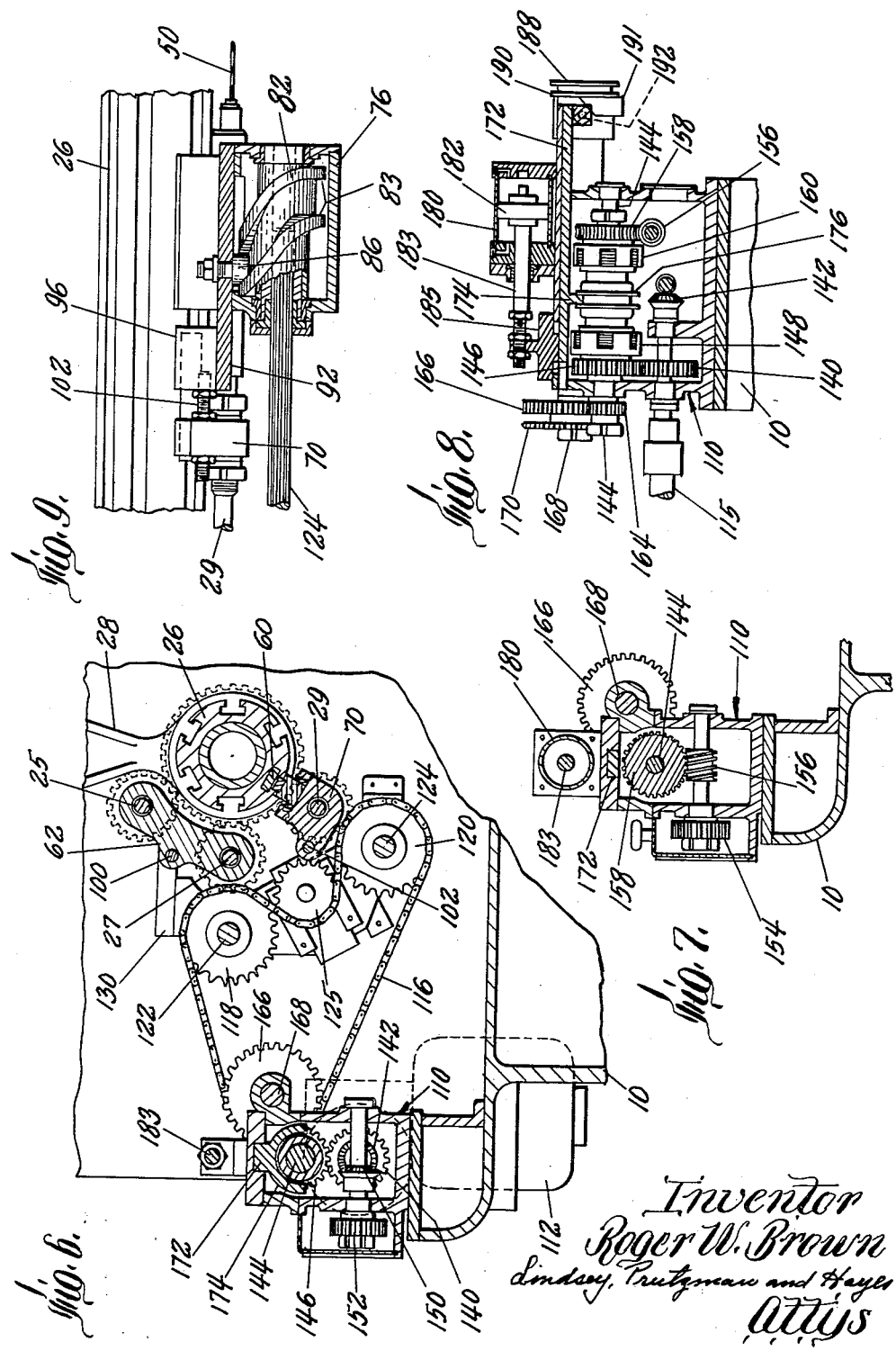
Inventor
Roger W. Brown
Lindsey, Prutzman and Hayes
Attys

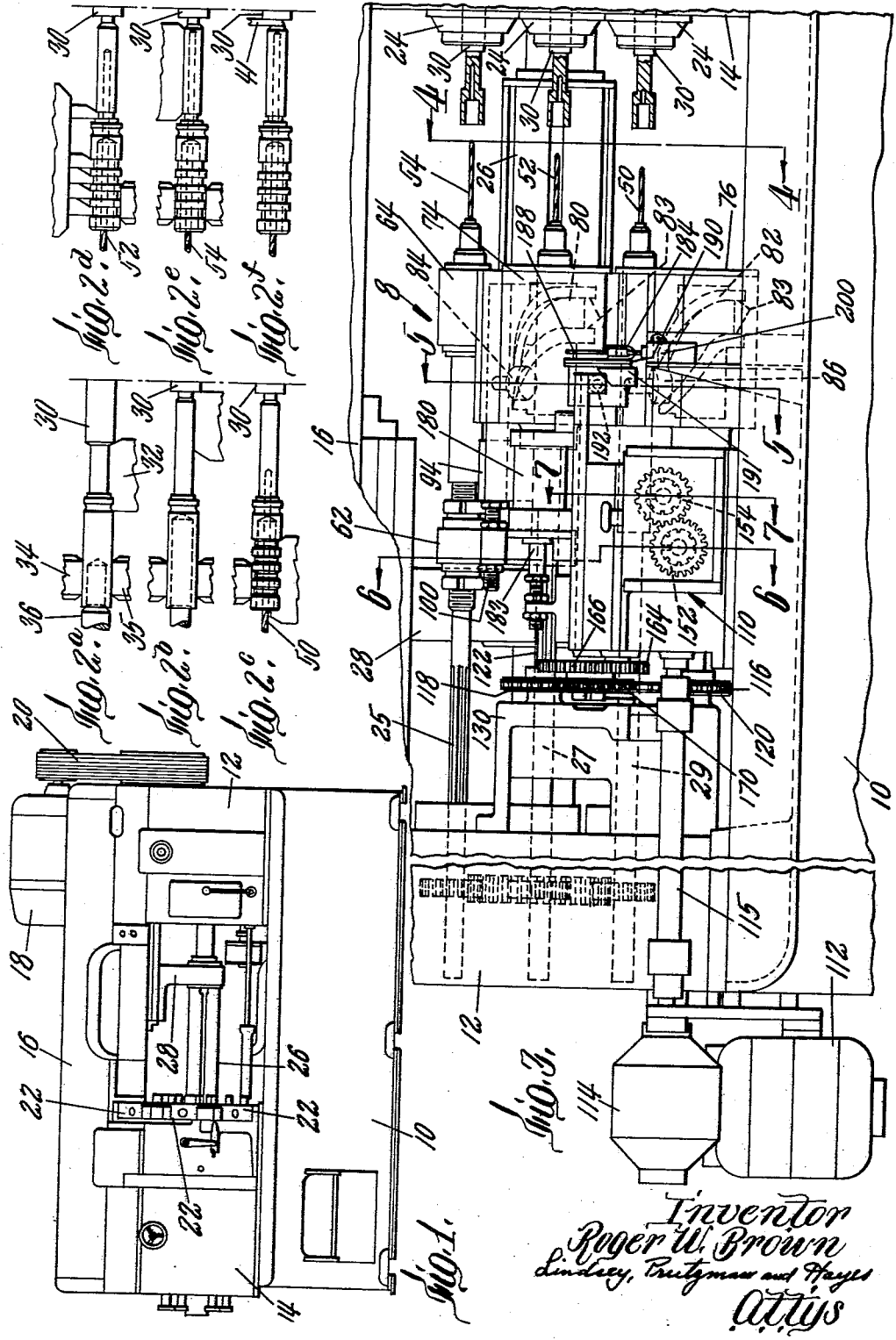

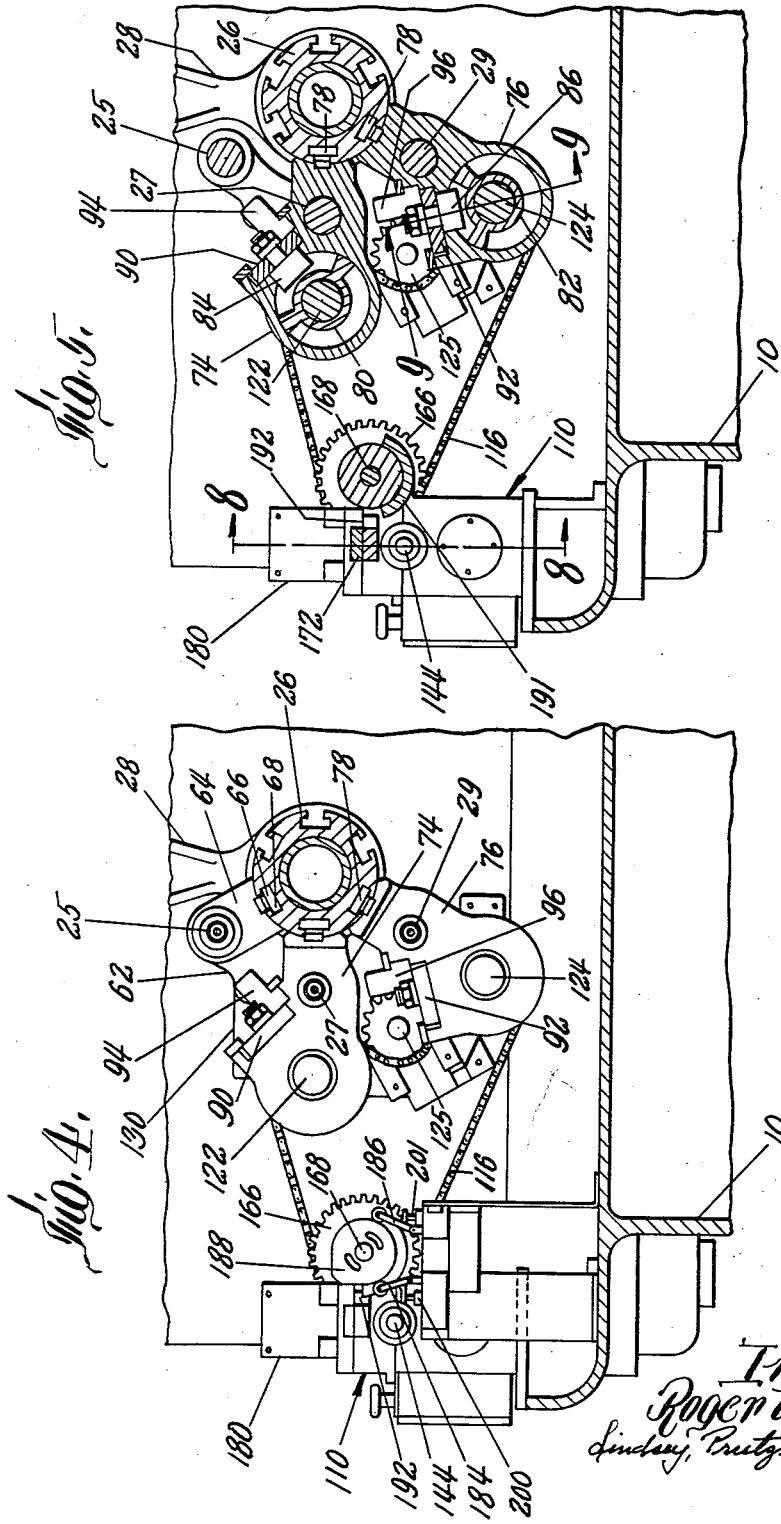

United States Patent Office 3,064,501
Patented Nov. 20, 1962

3,064,501
CUTTING TOOL FEED MECHANISM
Roger W. Brown, Windsor, Vt., assignor to Cone Automatic Machine Company, Inc., Windsor, Vt., a corporation of Vermont
Filed Mar. 29, 1961, Ser. No. 99,179
8 Claims. (Cl. 77—32.3)

The present invention relates to cutting tool feed mechanisms and has particular utility with a multiple spindle lathe for feeding one or more drills or other cutting tools into engagement with one or more lathe supported workpieces.

It is a general object of this invention to provide an improved cutting tool feed mechanism which periodically withdraws the cutting tool from the workpiece for removing chips and for subjecting the tool to a cooling and cleansing fluid, and which automatically returns the cutting tool to and feeds it into the workpiece.

It is another object of this invention to provide a cutting tool feed mechanism which is readily adaptable to and particularly useful with the central feed turret of a conventional multiple spindle lathe and which is capable of periodically feeding and withdrawing one or more cutting tools toward and away from and along the axis of the rotating workpieces drivingly supported by the lathe. To provide operational flexibility this feed mechanism is conveniently adapted for driving either a single or a number of cutting tools as found desirable in any particular lathe machining operation.

It is a further object of this invention to provide a cutting tool feed mechanism which periodically rapidly withdraws the cutting tool from and returns it to the workpiece and which slowly feeds the cutting tool into the workpiece; and, where the feed mechanism of this invention is associated with the central feed turret of a multiple spindle lathe, it is an object to provide this withdrawing, returning, and feeding cycle in cooperation with the conventional turret feed rate and without special adjustments thereof.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side elevation view of a conventional multiple spindle lathe upon which the feed mechanism of this invention can be conveniently assembled;

FIGS. 2a through 2f are fragmentary views of examples of cutting operations which can be performed by the multiple spindle lathe of FIG. 1 and for which the feed mechanism of this invention is particularly useful;

FIG. 3 is an enlarged fragmentary side elevation view of the rear side of the lathe of FIG. 1 and with an embodiment of the feed mechanism of this invention assembled thereon;

FIG. 4 is a fragmentary section view partially in cross section taken substantially along the line 4—4 of FIG. 3;

FIG. 5 is a fragmentary cross section view taken substantially along the line 5—5 of FIG. 3;

FIG. 6 is a fragmentary cross section view taken substantially along the line 6—6 of FIG. 3;

FIG. 7 is a fragmentary cross section view taken substantially along the line 7—7 of FIG. 3;

FIG. 8 is a fragmentary cross section view taken substantially along the line 8—8 of FIG. 5; and FIG. 9 is a fragmentary section view partially in cross section taken substantially along the line 9—9 of FIG. 5.

Referring to the drawings in detail, and particularly to FIGS. 1 and 3, an embodiment of the cutting tool feed mechanism of this invention, generally designated by the numeral 8, is shown installed on a conventional multiple spindle lathe having a base 10 and two upright columns 12 and 14 supporting an overhead bed 16 in which is rotatably mounted a lathe drum shaft (not shown) having a plurality of cams thereon which are adapted to operate the various lathe mechanisms in the proper timed sequence. A motor 18, a belt drive 20 and suitable gear arrangements provided in the upright columns 12 and 14 operate the drum shaft, a plurality of lathe cross slides 22, a central tool turret 26, a spindle carrier assembly mounted within the column 14 and having six work spindle assemblies 24, and the drill spindles 25, 27 and 29. In the conventional manner, the lathe provides a machining cycle during which bar stock is fed to the work spindle assemblies and indexed to each of the six lathe stations where different machining operations are performed.

The tool turret 26 is axially reciprocated for movement toward and away from the work spindle assemblies 24 by an actuating bracket 28 that is moved in timed sequence with the indexing of the work spindles by a cam on the drum shaft so that after the work spindles 24 are indexed, the turret is first moved at a high rate to place its supported cutting tools adjacent the bar stock 30, is then moved at a low feed rate for feeding the cutting tools to the bar stock, and, when the machining is completed, the turret is rapidly retracted to its initial position until the work spindle assemblies 24 are indexed to the next station.

FIGS. 2a through 2f give examples of the cutting operations that can be performed upon the lathe bar stock 30 in each of the six stations to which it is indexed by the spindle carrier assembly. FIG. 2a shows the initial machining of the bar stock 30 by a cutting tool 32 and a non-rotating drill 36, and with the bar stock being additionally supported by the rollers 34, 35. FIGS. 2b through 2f show the bar stock at the other lathe stations where other machining operations are performed including the severing of the machined workpiece at the last station by cutting tool 41. Deep drilling is shown performed by the drills 50, 52 and 54, and it is with such machining operations that periodic withdrawal of the cutting tool is desirable in order to remove the metal chips and to provide access to the drills for cleaning and cooling them by the usual lathe lubricant.

The drills 50, 52 and 54 (FIG. 3) located in the stations shown in FIGS. 2c, 2d and 2e, respectively, are rotatably driven by the drill spindles 29, 27 and 25, respectively, and these drill spindles are splined for axial movement within their driving gears located in the column 12.

Referring to the preferred embodiment of this invention, the upper spindle 25 is rotatably supported and axially retained by the brackets 62 and 64, the latter bracket being in turn mounted for reciprocable movement on the turret 26 by a T-shaped extension 66 that is slideably received within a correspondingly T-shaped slot 68 in the turret. The drill spindles 27 and 29 are rotatably supported and axially retained at their rear ends by the bracket 62 and a bracket 70, respectively, the latter bracket being slideably supported by a similar T-shaped extension 69 received within a slot in the turret 26. These spindles 27, 29 are slideably supported at their forward ends within cam housings 74 and 76 (FIG. 5) that are adjustably secured to the turret 26 through projections 78 received within the T-slots in the turret and a suitable locking means (not shown).

A pair of feed cams 80, 82, that are rotatably mounted within the cam housings 74 and 76, are adapted to move the drill spindles 25, 27 and 29 along the turret 26 by means of the cam followers 84 and 86, the slide members or links 90 and 92, the upstanding abutments 94 and 96 fixed to the slide members, and by the studs 100 and 102 that are threadably received by the abutments 94 and 96 and by the brackets 62 and 70, respectively. For adjustably locating the drills 50, 52 and 54, the cam housings 74 and 76 are adjustable upon the turret 26, and the brackets 62 and 70 are adjustable through the studs 100 and 102 relative to the abutments 94 and 96, respectively. The cams 80, 82 are provided with identical cam contours and are similarly disposed relative to the followers so that the followers are simultaneously actuated both toward and away from the spindle supported workpieces during a single rotation of the cams to provide identical concurrent oscillation of the spindles along the turret 26. The contour of the cams 80 and 82 has a forward camming portion 83 that maintains the followers 84 and 86, respectively, in a constant position during an angular portion of the rotation of the cams thereby maintaining the drills 50, 52 and 54 in a fixed position relative to the turret 26 for a short interval of time.

For controlling the speed of rotation of the cams 80, 82 there are provided high speed or withdrawing and low speed or feeding gear drives within a drive mechanism or transmission generally denoted by the numeral 110. This transmission is driven by a motor 112 via a reduction gearing box 114 and an input shaft 115, and drives the cams 80 and 82 through a drive chain 116, a pair of sprockets 118 and 120, and a pair of splined cam drive shafts 122 and 124. The sprockets 118 and 120 and a chain tightening idler sprocket 125 are rotatably mounted on a fixed support 130, and the splined cam driving shafts 122 and 124 are adapted to move axially relative to the cams 80 and 82 for allowing movement of the cams, the cam housings, and the turret relative to the cam drive mechanism.

Referring now particularly to FIGS. 6, 7 and 8, the drive mechanism 110 transmits the torque or rotation of the input shaft 115 to a shaft 144 either at a high speed by mating spur gears 140 and 146 and a friction plate type clutch 148, or at a low speed in the same rotational direction by mating bevel gears 142 and 150, mating spur gears 152 and 154 (FIG. 3), a worm gear 156 and a worm wheel 158, and a friction plate type clutch 160. For transmitting the motion of the shaft 144 to the chain 116, the shaft 144 is provided with a spur gear 164 that drives through a spur gear 166 a shaft 168 to which a chain driving sprocket 170 is affixed, the driving sprocket 170 and the sprockets 118 and 120 having the same number of teeth so that there is always the same angular relationship therebetween.

The high speed clutch 148 and the low speed clutch 160 are selectively actuated by a clutch operator 176 that is reciprocably mounted on the shaft 144, and which is operated by a fluid motor 180 through a piston 182, a piston rod 183, and a slide member 172 having an upstanding lug 185 adjustably connected to the rod 183 and a fixed yoke 174 for engaging and moving the clutch operator member 176 in either axial direction. The fluid motor 180 is suitably controlled by a pressurized fluid, preferably air, and a suitable valve arrangement (not shown) that is adapted to direct the pressurized fluid to either end of the fluid motor 180 and exhaust the opposite end and thereby drive the piston 182 in either axial direction. This valve arrangement is operated by high speed and low speed electrical circuits that are energized by the cam followers 184 and 186 (FIG. 4) which are actuated by the cams 188 and 190 (FIG. 3), respectively. The switch 200 is adapted when actuated to energize the high speed circuit to effect movement of the piston 182 to the left, as viewed in the drawings, for engaging the high speed clutch 148; and the switch 201 is adapted when actuated to energize the low speed circuit to effect movement of the piston 182 to the right for engaging the low speed clutch 160.

The cams 188, 190 are adjustably fixed to the sprocket shaft 168, and the arrangement and direction of rotation of the cams is such that the high speed clutch operating switch 200 is energized when the cam followers 84 and 86 are cammed to the full forward position and in engagement with the cam portion 83. Accordingly, the high speed clutch 148, when actuated effects an initial rapid withdrawal of the cutting drills 50, 52 and 54 and thereafter effects a rapid return of the cutting drills to the lathe supported bar stock 30. As the turret 26 continues to move forwardly toward the workpiece supporting spindles 24, during the period of time that the drills are withdrawn and returned to the workpiece, it is necessary that the rapid return movement of the drills terminates at a point on the turret rearwardly of the point from which the drills were initially retracted; otherwise, the drills would be brought in contact with the workpiece during their rapid movement with possible resulting damage to the drills or the workpiece. Accordingly, the slow speed clutch energizing switch 201 is actuated by the cam 190 prior to when the cam rollers 84 and 86 are cammed to the full forward position, and, therefore, the subsequent forward feed of the drills, during which the drill cutting is performed, is accomplished by the slow speed drive through the clutch 160.

When the turret 26 has reached its full forward position, the high speed clutch operating circuit is de-energized by a timing switch (not shown) that is actuated by the main drum shaft; and consequently, the low speed clutch 160 continues to rotate the feed cams 80 and 82 past the position where the high speed clutch is normally engaged. To disengage the low speed clutch 160 at a point in the cycle after where the high speed clutch 148 is normally engaged, for terminating the rotation of the feed cams, a cam 191 fixed to the shaft 168 is positioned to engage a cam follower 192 rotatably mounted on the slide 172 for moving the follower and slide to a neutral central position. Disengagement of the low speed clutch 160 is accomplished preferably while the cam followers 84 and 86 are still in engagement with the feed cam portions 83 in order that the withdrawing and feeding cycle is terminated with the drills in the full forward position relative to the turret 26.

In operation, the machining cycle commences subsequent to the indexing of the collet assembly by the rapid movement of the central tool turret 26 forwardly to position its supported drills adjacent the lathe supported bar stock 30, and then by slow forward movement of the turret for feeding the drills into the bar stock. When the slow forward movement begins, the feed cycle timing switch (not shown) is actuated by the main drum shaft for energizing the high speed clutch operating circuit to engage the high speed clutch 148 and thereby initiate the repetitive alternate engagement of the high speed and low speed clutches 148 and 160 for bringing about withdrawal and feeding of the drills 50, 52 and 54. When the turret 26 reaches its full forward position, the timing switch is actuated to deenergize the high speed clutch circuit to allow the slow speed clutch 160 drive the feed cams until that clutch is disengaged by the camming action of the cam 191 on the roller 192. As determined by the main drum shaft, the turret 26 is then rapidly moved rearwardly or withdrawn and the workpiece spindle carrier is indexed to the next station for initiating another machining cycle.

The feed mechanism of this invention therefore provides a means which is readily adaptable to and particularly useful in cooperations with the central tool turret of a multiple spindle lathe for periodically feeding and withdrawing one or more drills or other cutting tools into the lathe supported workpieces. This mechanism accomplishes this function without altering the conventional central turret feed and can be adapted to the lathe for control of the feed of one or more of the turret supported cutting tools.

Additionally, by proper choice of cam contours and by proper positioning of the transmission clutch operating cams, any desired withdrawal and feed rate may be obtained.

As will be apparent to persons skilled in the art, various modifications and adaptations of the structure above described will become readily apparent without departure from the spirit and scope of the invention, the scope of which is defined in the appended claims.

I claim:

1. For use with a lathe having a workpiece mounted thereon and a cutting tool supported for movement toward and away from the workpiece, a cutting tool feed mechanism comprising; a feed cam support mounted upon the lathe and a feed cam supported thereon, a cam follower engaging the feed cam and being adapted to be oscillated by the feed cam, means operably connecting the cutting tool and the cam follower and translating oscillatory movement of the cam follower into oscillatory movement of the cutting tool, a motor driven transmission having an output shaft drivingly connected to the feed cam, said transmission having a relatively high speed gear train and a relatively slow speed gear train each having clutches therein for connecting the gear trains to the output shaft, means selectively engaging said clutches, and timing means alternately operating the selective means for engaging the high speed gear train clutch to rapidly withdraw and return the cutting tool to the workpiece and for engaging the slow speed gear train clutch to feed the cutting tool into engagement with the workpiece.

2. For use with a lathe having a workpiece mounted thereon, a tool turret adapted for movement toward and away from the workpiece, and a cutting tool supported for reciprocal movement toward and away from the workpiece parallel to the axis of movement of the turret, a cutting tool feed mechanism comprising; a cam support fixed upon said tool turret, a feed cam rotatably mounted on said support on an axis parallel to the axis of movement of the turret, a cam follower in engagement with the feed cam and adapted to be oscillated thereby, said follower having a supporting link reciprocably mounted for movement parallel to the axis of movement of the turret, means operably connecting the cam follower supporting link to the cutting tool and reciprocating the cutting tool upon oscillation of the cam follower, a motor driven transmission drivingly connected to the feed cam, said transmission having a relatively high speed transmission means and a relatively low speed transmission means and a pair of clutches selectively connecting the high and low speed transmission means for driving the cam at high and low speeds respectively, a clutch operator adapted to selectively engage the clutches, and timing means operating said clutch operator for periodic rapid withdrawal and return of the cutting tool piece and for slow forward feeding of the cutting tool.

3. For use with a lathe having a plurality of workpiece supporting spindles, a tool turret adapted for movement toward and away from the workpieces, and a plurality of cutting tools supported for movement toward and away from the workpieces parallel to the axis of movement of the turret, a cutting tool feed mechanism, comprising; a plurality of cam supports adjustably fixed upon the central turret and having a feed cam rotatably mounted thereon, a plurality of drive shafts operably connected to said feed cams and having shaft driving sprockets thereon, said shafts having their axes parallel ot the axis of movement of the turret, each of said feed cams having a cam follower in engagement therewith, the followers being adapted to be oscillated upon rotation fo the cam, means operably connecting the cam followers to the cutting tools and translating oscillatory motion of the follower into oscillatory feed and withdrawal motion of the cutting tool, a motor driven transmission having an output shaft with an output sprocket rotatably driven thereby, and a sprocket chain operably connecting the transmission output sprocket and the shaft driving sprockets.

4. The cutting tool feed mechanism of claim 3 wherein the transmission has a relatively low speed gear train and a relatively high speed gear train with clutches selectively connecting the gear trains to the transmission output sprocket, a clutch operator selectively engaging the clutches, and cam actuated timing means operating the clutch operator and adapted to engage the low speed gear train clutch for feeding the cutting tools into cutting engagement with the workpieces and to engage the high speed gear train clutch for withdrawing the cutting tools from and returning them to the workpieces.

5. In combination with a lathe having a workpiece supporting spindle, a turret adapted for movement toward and away from the workpiece, and a cutting tool supported for reciprocable movement toward and away from the spindle supported workpiece parallel to the axis of movement of the turret, a cutting tool feed mechanism, comprising; a motor driven transmission having a driven output and a relatively high speed driving means and a relatively low speed driving means, said transmission further having a pair of clutches operably connecting the high and low speed driving means to the driven output, cutting tool oscillating means supported by the turret and operably connected to the cutting tool and being adapted to oscillate the cutting tool toward and away from the workpiece, means operably connecting the transmission driven output and the cutting tool oscillating means, a clutch operator adapted for selective engagement of the high speed and low speed clutches, and cam operated motor means operably connected to the clutch operator and engaging the high speed clutch for rapidly withdrawing and returning the cutting tool, and further engaging the low speed clutch for feeding the cutting tool into the workpiece.

6. The combination defined in claim 5 wherein the cutting tool feed mechanism further comprises, a high speed clutch operating cam and cam follower, a low speed clutch operating cam and cam follower, said cams being drivingly connected to said transmission for operation thereby, the high speed clutch operating cam follower being adapted to be actuated by the high speed clutch operating cam for engaging the high speed clutch, the low speed clutch operating cam follower being adapted to be actuated by the low speed clutch operating cam for engaging the low speed clutch, a neutral cam operably driven by the transmission, a neutral cam follower connected to the clutch operator and moving the clutch operator to a neutral non-clutch-engaging position when the low speed clutch is maintained in prolonged engagement, and timing means coordinated with the feed motion of the turret preventing high speed clutch engagement and prolonging the engagement of the low speed clutch.

7. A cutting tool feed mechanism for use with a machine having a workpiece supported thereon, and a cutting tool adapted to move toward and away from the workpiece for periodically engaging the workpiece, comprising; a feed cam rotatably supported upon the machine, a cam follower having engagement with the cam for continuous actuation thereby, means operably connecting the said cam follower to the cutting tool and moving the cutting tool toward and away from the workpiece upon rotation of the feed cam, a motor driven transmission having relatively high speed and relatively low speed driving means, high speed and low speed clutches operably connected to the high speed and low speed driving means and to the feed cam for driving the feed cam at relatively high and relatively low speeds respectively, a clutch operator adapted for selectively engaging the high speed and low speed clutches, a motor operably connected to the clutch operator and adapted to move the operator for engaging either clutch, cams and cam followers operably driven by the transmission and controlling the clutch operator motor for engaging the high speed and the low speed clutches, said cam followers being positioned so that the cutting drill is withdrawn and returned to the workpiece by the high speed driving means and is fed for cutting the workpiece by the low speed driving means.

8. For use with a lathe having a plurality of workpiece supporting spindles, a tool turret adapted for movement toward and away from the workpiece supporting spindles, and a plurality of cutting tools mounted for movement toward and away from the workpieces along an axis parallel to the axis of movement of the turret, a cutting tool feed mechanism comprising; two cam supports fixed to the central tool turret for movement therewith, each of said cam supports rotatably supporting and axially retaining a feed cam thereon, a cam follower in engagement with each of the feed cams, a link fixed to each cam follower and slideably mounted for movement parallel to the axis of movement of the turret, a first bracket rotatably supporting and axially retaining one of the cutting tools, a second bracket rotatably supporting and axially retaining another of the cutting tools, adjustable means connecting the follower supporting links and the first and second brackets, a sprocket drivingly connected to each of the cams, a motor driven transmission mounted upon the lathe having an output shaft with an output sprocket drivingly connected thereto, a drive chain drivingly connecting the output sprocket and the cam driving sprockets, said sprockets having an equal number of teeth for maintaining them in the same angular relationship, said transmission having a low speed gear train and a high speed gear train, each of the gear trains having a clutch connecting the output thereof to the transmission output shaft, a reciprocably mounted clutch operator adapted for movement in opposite directions to engage the high speed and low speed gear train clutches, a fluid motor having a piston connected to said clutch operator and being adapted to actuate the operator in either reciprocable direction for selectively engaging the clutches, a fluid motor control system for operating the fluid motor piston in either direction, first and second cams fixed upon said output shaft and first and second cam followers controlling the fluid motor control system for engaging the high and the low speed gear train clutches respectively, a neutral cam fixed to the output shaft, a neutral cam follower fixed to the clutch operator for moving the clutch operator to the neutral position when the low speed gear train continues to drive the output shaft past the point where the high speed clutch is normally engaged, and a timing switch actuated by the lathe for overriding the effect of the first cam follower and preventing high speed clutch engagement thereby.

References Cited in the file of this patent
UNITED STATES PATENTS 1,809,402   Cone _____ June 9, 1939